United States Patent [19]

Kohori

[11] 4,111,082
[45] Sep. 5, 1978

[54] CENTER ASSEMBLY INCLUDING OIL RESERVOIR FOR MACHINE TOOLS

[76] Inventor: Kiyotaka Kohori, 40-4 3-chome, Aoyamadai, Suita, Osaka, Japan

[21] Appl. No.: 761,219

[22] Filed: Jan. 21, 1977

[30] Foreign Application Priority Data

Aug. 17, 1976 [JP] Japan ............................ 51-98337
Aug. 23, 1976 [JP] Japan ............................ 51-100826
Aug. 23, 1976 [JP] Japan ........................ 51-113428[U]

[51] Int. Cl.² .................. B23B 23/02; B23Q 11/12
[52] U.S. Cl. ........................................ 82/33 R; 82/31; 184/6.14
[58] Field of Search ............ 82/33 R, 31; 184/6.14, 184/28, 80, 82

[56] References Cited

U.S. PATENT DOCUMENTS

| | | | |
|---|---|---|---|
| 1,477,182 | 12/1923 | Muller | 82/31 |
| 1,598,134 | 8/1926 | Harten et al. | 82/33 R |
| 1,889,502 | 11/1932 | Smith | 82/33 R |
| 2,347,112 | 4/1944 | Jung | 184/82 |

*Primary Examiner*—Leonidas Vlachos
*Attorney, Agent, or Firm*—George B. Oujevolk

[57] ABSTRACT

A center assembly comprising a center and an oil reservoir, the oil reservoir having a leg extending from its lower wall and formed with a bore extending therethrough and with an oil passage having a lower end opened to the bore and an upper end opened in the inner surface of the lower wall of the oil reservoir, the center fitting in the bore and being formed with an oil channel having one end opened in the outer peripheral surface of a cylindrical body portion of the center and in register with the lower end opening of the oil passage in the leg, the oil channel having the other end opened in a conical front end of the center in the vicinity of its extremity. The lubricant in the oil reservoir flows through the oil passage and channel to the front end of the center to lubricate the front end and the inner surface defining the center hole of work.

3 Claims, 5 Drawing Figures

CENTER ASSEMBLY INCLUDING OIL RESERVOIR FOR MACHINE TOOLS

BACKGROUND OF THE INVENTION

This invention relates to a center assembly including an oil reservoir for machine tools.

The term "machine tool" as used herein and in the appended claims includes all machine tools, such as lathes and cylindrical grinders, which are equipped with a tailstock.

When work is machined on a machine tool, the work is supported by a chuck at one end and by a center at the other end, with the front end of the center fitted in a center hole in the work. The work thus supported is driven. Accordingly, friction occurs between the front end of the center and the inner surface defining the center hole of the work, possibly causing damage to the tip of the center with the resulting heat. For this reason, it is impossible to rotate the work at a high speed when the work is supported by a usual dead center. This drawback may be overcome by a center in which the front end alone is made of cemented carbide alloy or by a so-called live center comprising a body portion and a front end portion mounted on the body portion by a bearing and rotatable with the work. With the former center, however, frication still takes place between the cemented carbide front end and the inner surface defining the center hole of the work, consequently limiting the speed of rotation of the work. Although the latter involves no friction between the front end portion and the work and is therefore free of the damage to be otherwise caused by frictional heat because the front end portion is rotatable with the work, the rotatable front end portion tends to deflect due to the high-speed rotation of the work, reducing the dimensional accuracy of the work obtained. Furthermore, the center is complex to make.

SUMMARY OF THE INVENTION

The object of this invention is to provide a center for machine tools which is free of the drawbacks described above. More particularly, this invention provides a center assembly comprising a center and an oil reservoir, the oil reservoir having a leg extending from its bottom wall and formed with a bore extending therethrough and with an oil passage having a lower end opened to the bore and an upper end opened in the inner surface of the bottom wall of the oil reservoir, the center fitting in the bore and being formed with an oil channel having one end opened in the outer peripheral surface of a cylindrical body portion of the center and in register with the lower end opening of the oil passage in the leg, the oil channel having the other end opened in a conical front end of the center in the vicinity of its extremity.

The lubricant in the oil reservoir flows through the oil passage and channel to the conical front end of the center and into the center hole of work to lubricate the front end and the inner surface defining the hole.

This invention will be described below in greater detail with reference to the accompanying drawings.

DESCRIPTION OF THE PREFERRED EMBODIMENTS

Figure 1:
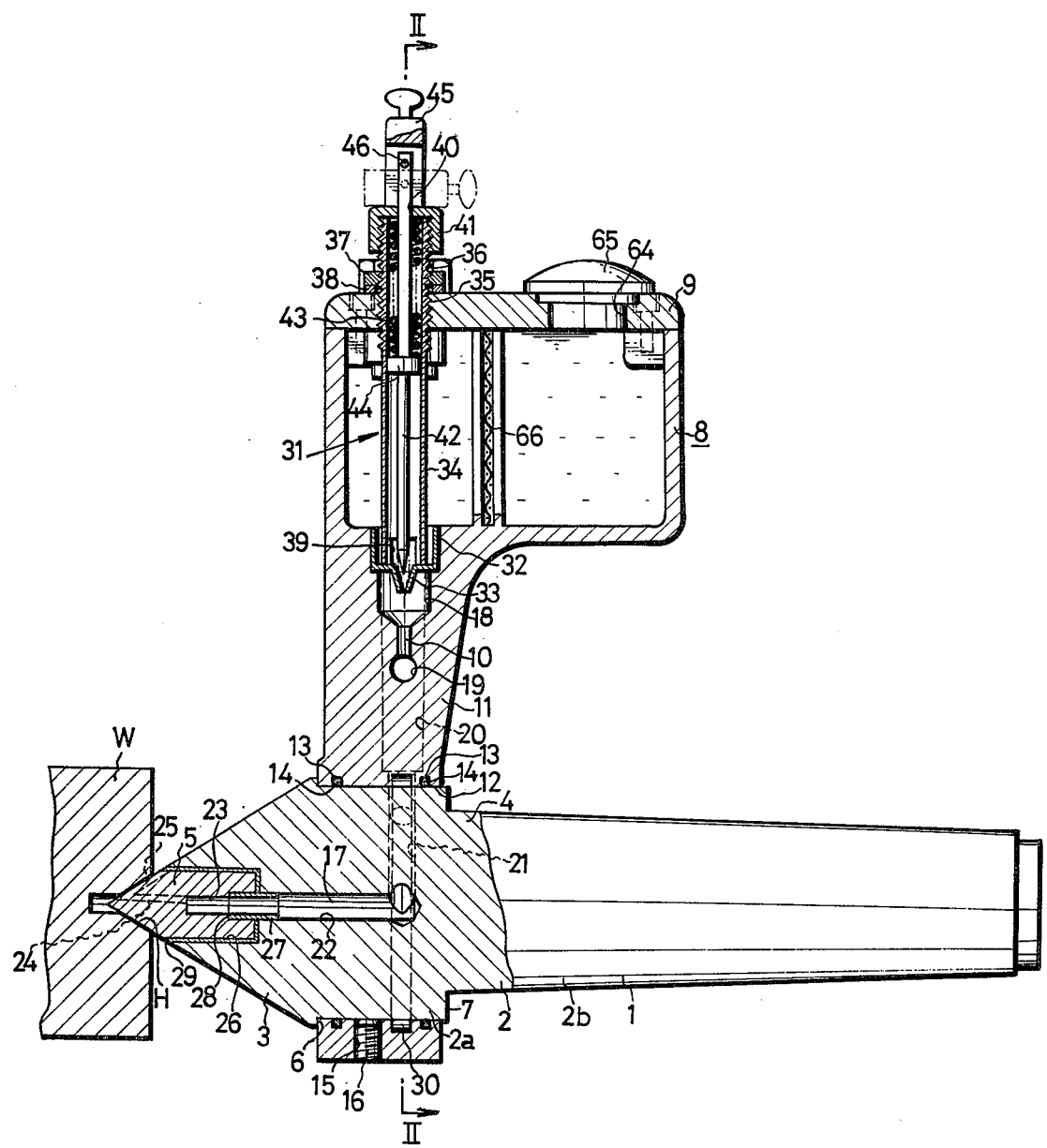
FIG. 1 is a side elevation partly broken away to show an embodiment of this invention.
Figure 2:
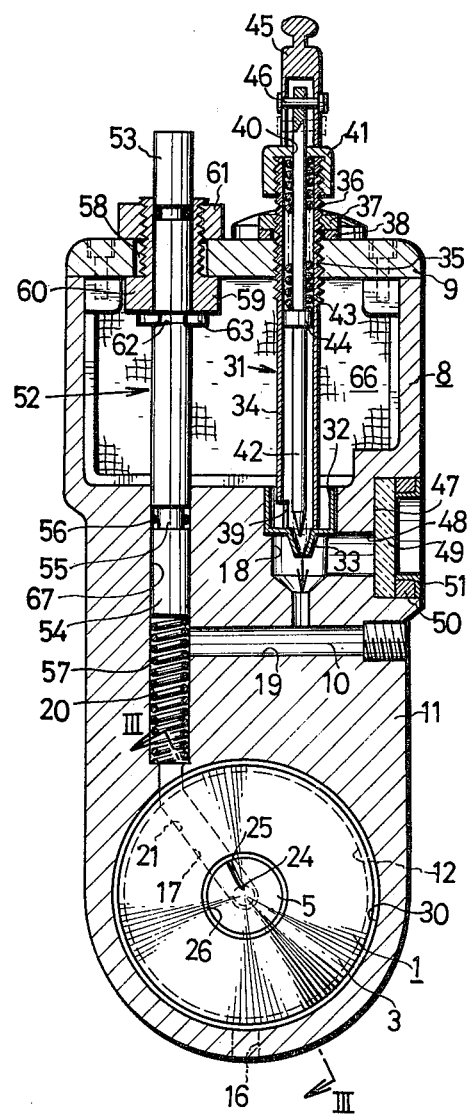
FIG. 2 is a view in section taken along the line II—II in FIG. 1, a center being not shown in section.
Figure 3:
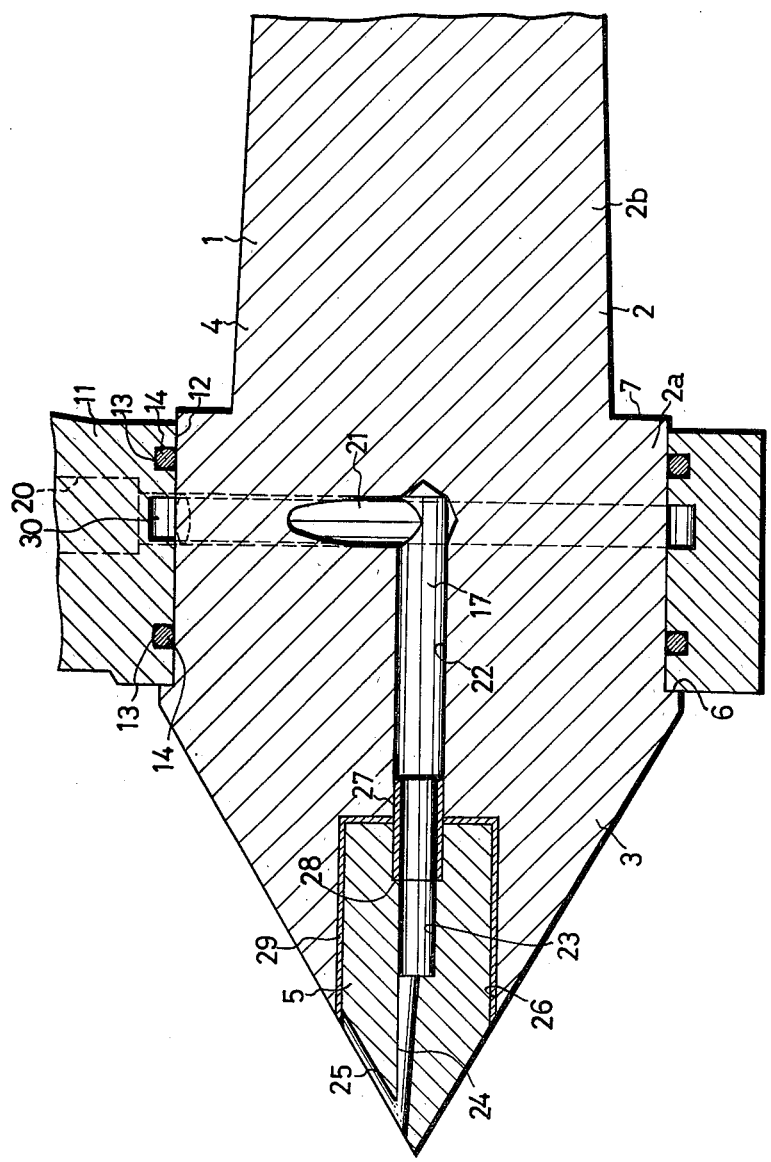
FIG. 3 is an enlarged view in section taken along the line III—III in FIG. 2 to show the main part.

With reference to FIGS. 1 to 3, a center 1 comprises, in appearance, a substantially cylindrical body portion 2 and a conical front end portion 3. In respect of construction, the center 1 comprises a center main body 4 and a front end member 5 of cemented carbide alloy fitting in a cavity 26 formed in the front end of the main body 4. The body portion 2 includes a cylindrical portion 2a integral with the front end portion 3 and a tapered portion 2b extending from the cylindrical portion 2a. A stepped portion 6 is formed between the front end portion 3 and the cylindrical portion 2a, and another stepped portion 7 between the cylindrical portion 2a and the tapered portion 2b. An oil reservoir 8 has a cover 9 on its open top and a leg 11 extending downward from its bottom wall. The leg 11 is formed in its lower portion with a bore 12 extending therethrough for receiving the center. The bore 12 has a diameter approximately equal to the diameter of the cylindrical portion 2a. The cylindrical portion 2a of the center 2 rotatably fits in the bore 12. The inner peripheral surface defining the bore 12 is formed with a pair of O-ring grooves 13 accommodating O-rings 14 respectively to provide a seal between the inner peripheral surface and the outer peripheral surface of the cylindrical portion 2a. A threaded hole 15 extends through the lower end of the leg 11 and communicates with the bore 12. A setscrew 16 screwed into the threaded hole 15 bears against the outer periphery of the cylindrical portion 2a of the center 1, whereby the oil reservoir 8 is locked to the center 1 against rotation relative to the center. When the setscrew 16 is loosened, the center 1 is rotatable relative to the oil reservoir 8.

The leg 11 is formed with an oil passage 10 having a lower end opening in the inner peripheral surface defining the bore 12 and an upper end opening in the inner surface of the bottom wall of the oil reservoir 8. The center 1 is provided with an oil channel 17 having one end opened in the outer peripheral surface of the cylindrical portion 2a of the body portion 2 and in register with the lower end opening of the oil passage 10 in the leg 11. The other end of the oil channel 17 is opened in the vicinity of the extremtiy of the conical front end portion 3, namely in a portion other than the extremity. The oil passage 10 comprises a first passage portion 18 to a third passage portion 20. The oil channel 17 comprises a first channel portion 21 to a fourth channel portion 24. The first channel portion 21 extends radially of the center 1 and communicates at its one end with the lower end of the third passage portion 20. The other end of the channel portion 21 is positioned on the axis of the center 1. The second channel portion 22 communicates at one end with the first channel portion 21 and at the other end with the cavity 26 formed in the center main body 4. The second channel portion 22 is coaxial with the center 1. The third channel portion 23 is formed in the front end member 5 coaxially therewith and has one end opened in the rear end of the front end member 5 and communicating with the second channel portion 22, the other end of the portion 23 terminating at an intermediate portion of the length of the member 5. The fourth channel portion 24 is formed in the front end member 5 eccentrically with respect to the axis of the member 5 and has one end in communication with the third channel portion 23 and the other end opened in the vicinity of the front extremity of the front end member 5.

Since the oil channel 17 has an open end in the vicinity of the foremost end of the center 1, the front end of the center 1 is sharp-pointed. Accordingly, the center 1 can support work W even if it has a small center hole H. The front end member 5 has an oil groove 25 communicating with the front end opening of the fourth channel portion 24 and extending radially of the center 1, namely along the generating line of the conical front end member 5.

The front end member 5 is mounted in the center main body 4 in the following manner. A tube 27 is inserted into the third channel portion 23 of the front end member 5 from its rear end up to the position where the tube 27 bears against a stepped portion 28 formed in the third channel portion 23, with the rear half of the tube 27 projecting from the rear end of the front end member 5. The tube 27 is adapted for press-fit contact with the second channel portion 22. The front end member 5 having the tube thus installed therein is loosely fitted into the cavity 26, with the projecting portion of the tube 27 tightly fitted into the second channel portion 22. Finally, silver solder is poured into a clearance 29 between the front end member 5 and the center main body 4 to braze the member 5 to the main body 4. The tube 27 serves to prevent the solder from flowing through the clearance 29 into the second or third channel portion 22 or 23 and blocking the portion.

An annular oil groove formed in the inner peripheral surface defining the bore 12 intersects the lower end of the third passage portion 20. Accordingly, even when the center 1 turns relative to the oil reservoir 8, the annular oil groove 30 maintains the third passage portion 20 in communication with the first channel portion 21 at all times. The annular oil groove 30 thus permitting the oil passage 10 extending from the oil reservoir 8 to communicate with the oil channel 17 in the center 1 at all times therefore gives the center 1 the advantage that the direction of the oil groove 25 can be altered as desired by turning the center 1 relative to the oil reservoir 8.

It is not desirable that the oil groove 25 be at the position where the front end member 5 bears against the inner surface defining the center hole H of the work W. Preferably, the oil groove 25 should be so positioned that it is most remote from the position where the inner surface defining the center hole H is pressed on by the end member 5, because if the inner surface is pressed on by the grooved portion 25 of the end member 5, the opposite side edges defining the oil groove 25 act like a cutter, enlarging the center hole H by cutting the inner surface and also because the inner surface will close the opening of the oil groove 25 and impede the outflow of the oil. For these reasons, the oil groove 25 is oriented in a predetermined direction in accordance with the type of the machine tool, the weight of the work, cutting resistance and like conditions. For example, when the work W is so heavy that the gravity thereon overcomes the counterforce of the cutting resistance acting on the work W, the oil groove 25 is positioned on the lower side of the end member 5. Conversely, if the work W is light and is cut on a lathe such that the gravity thereon is unable to overcome the counterforce of the cutting resistance on the work W, the oil groove 25 is positioned on the upper side of the end member 5 and is slightly inclined leftward as seen in FIG. 2.

The oil reservoir 8 is provided with a needle valve 31 for opening and closing the first passage portion 18. A valve seat 32 having a truncated conical portion 33 fits in the upper end of the first passage portion 18. A guide tube 34 having a lower end bearing on the valve seat 32 and an upper end projecting outward through the cover 9 is secured to the cover 9. More specifically, an externally threaded portion 36 formed around an upper portion of the tube 34 extends through a threaded hole 35 in the cover 9 in screw-thread engagement therewith. To hold the tube 34 against displacement, a nut 37 is screwed on the externally threaded portion 36 and is fastened to the cover 9 with a washer 38 provided therebetween. The tube 34 has an opening 39 in its lower end. An annular cap 41 having a hole 40 is screwed on the upper end of the tube 34. The tube 34 houses a needle valve element 42 having a conical lower end fittable in the truncated conical portion 33 of the valve seat 32 and an upper end extending outward through the hole 40 of the annular cap 41. The needle valve element 42 is biased downward at all times by a coiled spring 43 mounted thereon and having an upper end bearing against the annular cap 41 and a lower end against a flange 44 on the valve element 42. A tiltable knob 45 for manipulating the needle valve element 42 is pivoted to the upper end of the valve element 42 by a pin 46. The knob 45, when in its upright position, retains the valve element 42 in its raised position against the force of the spring 43, leaving the valve 31 open, whereas when tilted to a horizontal position, the knob 45 permits the spring 43 to depress the valve element 42 to open the valve 31.

With reference to FIG. 2, the oil reservoir 8 has an aperture 48 through which the first passage portion 18 is accessible from outside and which is provided with a stepped portion 47. Fitted to the stepped portion 47 is a transparent plate 49 held in place by an annular packing 50. The outflow of the oil is therefore observable through the transparent plate 49. A packing protector ring 51 of L-shaped cross section fits over the packing 50.

The oil reservoir 8 is further equipped with a pump 52 for preventing clogging. A plunger 54 integral with a handle rod 53 thereabove slidably fits in a vertical bore 67 communicating with the third passage portion 20. The handle rod 53 projects outward through the cover 9. At the boundary between the plunger 54 and the handle rod 53, there is a constricted portion 55 having an O-ring 56 therearound. The plunger 54 is biased upward by a coiled spring 57 having one end bearing against the bottom of the plunger 54 and the other end against a stepped portion formed in the third passage portion 20. The handle rod 53 is guided by a threaded sleeve 60 having a flange 59 and extending through a hole 58 in the cover 9. A nut 61 screwed on the threaded sleeve 60 fastens the flange 59 to the cover 9. A split spring washer 63 fits in an annular groove 62 formed in a longitudinally intermediate portion of the handle rod 53. The washer 63 in bearing contact with the flange 59 retains the plunger 54 within the bore 67 against the force of the coiled spring 57. When the handle rod 53 is depressed against the action of the spring 57, the oil is forced out from the third passage portion 20 and the first channel portion 21 to the fourth channel portion 24, whereby these portions 20 to 24 are cleaned.

The cover 9 is formed with an oil inlet 64 which is closed with a plug 65.

A strainer 66 installed in the oil reservoir 8 divides the interior of the reservoir 8 into two compartments, one being provided with the oil inlet 64 and the other with the first passage portion 18. The oil placed in through the inlet 64 is cleaned while passing through the strainer 66 and then flows through the oil passage 10 and the oil channel 17 into the oil groove 25 in the front end member 5. The oil thus fed to the oil groove lubricates the inner surface defining the center hole H of the work W and the front end member 5.

Figure 4:
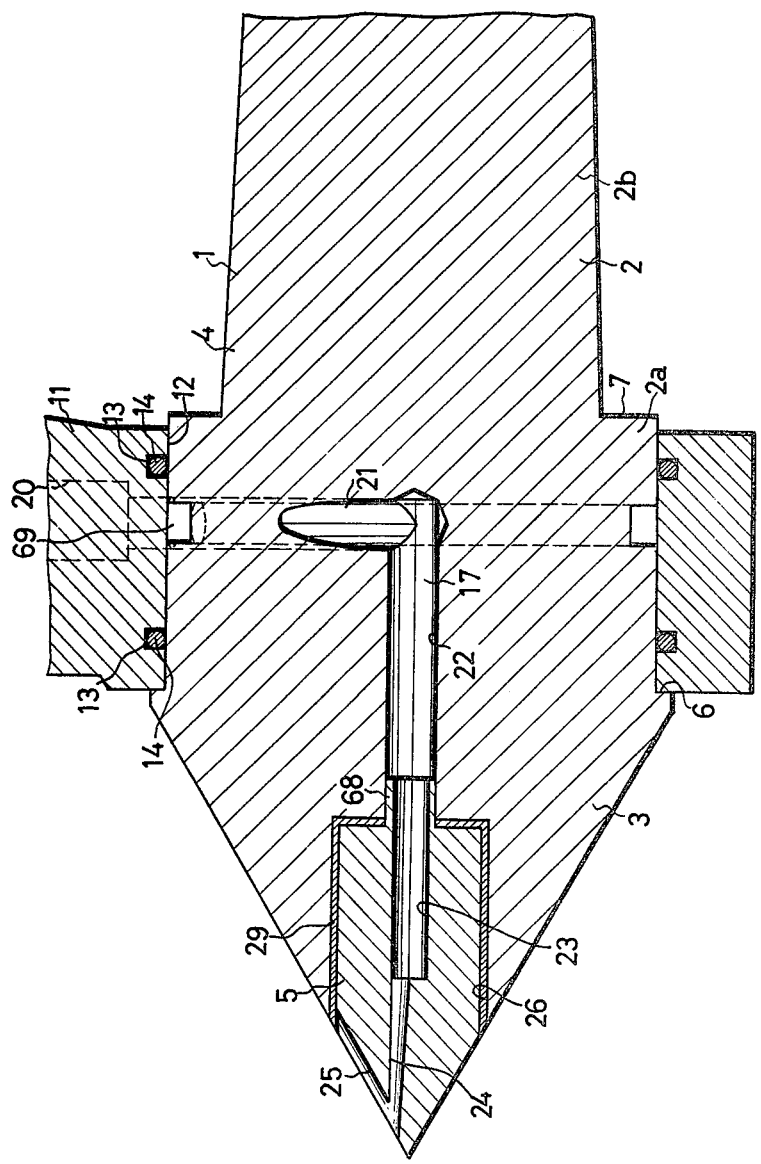
FIG. 4 is a view corresponding to FIG. 3 and showing another embodiment.

FIG. 4 shows another embodiment of this invention. The cylindrical body portion 2 of the center 1 is formed in its outer peripheral surface with an annular groove 69 intersecting the junction between the oil passage 10 and the oil channel 17. The front end member 5 is integrally provided with a tube 68 coaxial with the third channel portion 23 and extending rearward from the rear end of the member 5. The tube 68 tightly fits in the second channel portion 22. Except for these features, this embodiment has the same structure as the first embodiment.

Figure 5:
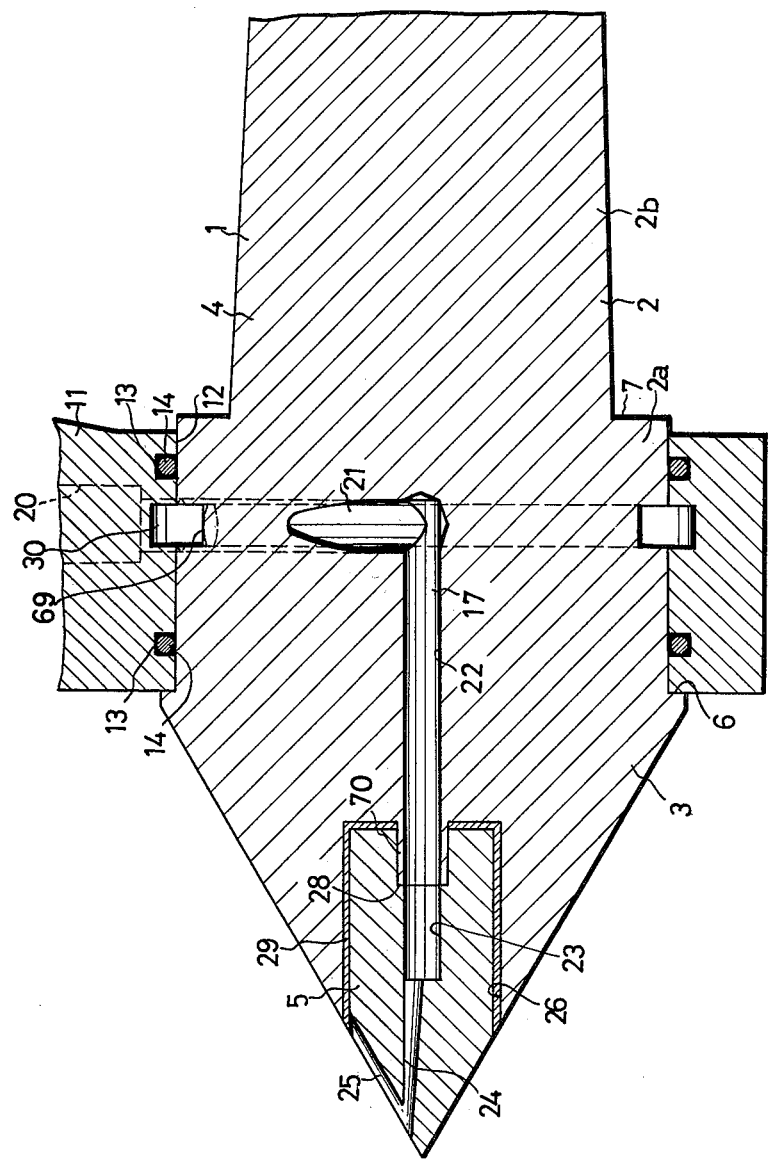
FIG. 5 is a view corresponding to FIG. 3 and showing still another embodiment.

FIG. 5 shows another embodiment in which the inner peripheral surface defining the bore 12 is formed with an annular oil groove 30 intersecting the junction between the oil passage 10 and oil channel 17 and opposed to an annular oil groove 69 formed in the outer peripheral surface of the cylindrical body portion 2 of the center 1. The bottom wall of the cavity 26 in the center main body 4 is integrally formed with a forwardly projecting tube 70 coaxial with the second channel portion 22 and tightly fitting in the third channel portion 23. Except for these features, this embodiment has the same structure as the first embodiment.

This invention may be embodied differently without departing from the spirit and basic features of the invention. Accordingly, the embodiments herein disclosed are given for illustrative purposes only and are not in any way limitative. It is to be understood that the scope of this invention is defined by the appended claims rather than by the specification and that various alterations and modifications within the definition and scope of the claims are included in the claims.

I claim:

1. A center assembly for machine tools comprising in combination:

(a) a center (1) with a cylindrical body portion and a conical front end portion;
(b) an oil reservoir (8) with a cover and a bottom wall disposed above said center (1) having a leg (11) extending from its bottom wall and formed with a first bore (12) extending therethrough and with an oil passage (10) having a lower end opened to the bore (12) and an upper end opened in the inner surface of said bottom wall, said center (1) being rotatably coupled to said bore (12), a pump (52) to prevent clogging in said oil reservoir (8) including a vertical second bore (67) in said leg (11), a plunger (54) slidable in said vertical second bore (67) communicating with said oil passage (10), a spring (57) coupled to and upwardly biasing said plunger (54), and, a handle rod (53) integral with the plunger (54) extending outward through said reservoir cover;
(c) an oil channel (17) extending approximately along the geometric central line of said conical front end, said oil channel having one end opened to the outer peripheral surface of said cylindrical body portion in register with the lower end opening of said oil passage (10) and the outer end opened in said conical front end portion in the vicinity of its end; and,
(d) a downward biased needle valve coupled for opening and closing said oil passage upper end, said needle valve having:
a valve seat (32) fixedly fitted in the upper end opening of the oil passage (10), a guide tube (34) having a lower end bearing on the valve seat and an upper end projecting outward through said cover, an annular cap (41) secured to the upper end of the guide tube (34), a needle valve element (42) vertically slidably housed in the guide tube (34) and having an upper end extending outward from the guide tube through the annular cap, a spring (43) for downwardly biasing the needle valve element and a tiltable knob (45) pivoted to the upper end of the needle valve element to raise and lower the valve element.

2. A center assembly as defined in claim 1, wherein the leg has a threaded hole radially extending through the peripheral wall defining the first bore, and a setscrew is screwed into the threaded hole to lock the center to the oil reservoir.

3. A center assembly as defined in claim 1 wherein a strainer divides the interior of the oil reservoir into two compartments, one compartment being provided with an oil inlet, the other compartment having the upper end opening of the oil passage.

* * * * *